US012651127B2

(12) United States Patent
Tamayo et al.

(10) Patent No.: US 12,651,127 B2
(45) Date of Patent: Jun. 9, 2026

(54) DYNAMIC QUESTIONS AND CLUSTERS FOR EVENTS

(71) Applicant: Capital One Services, LLC, McLean, VA (US)

(72) Inventors: Bryan Tamayo, Allen, TX (US); Unique Samantha Carey, Little Elm, TX (US); Catherine Lueatrice Lovett, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 309 days.

(21) Appl. No.: 18/240,870

(22) Filed: Aug. 31, 2023

(65) Prior Publication Data

US 2025/0077787 A1     Mar. 6, 2025

(51) Int. Cl.
G06F 40/40     (2020.01)
G06F 40/30     (2020.01)
G06N 20/00     (2019.01)

(52) U.S. Cl.
CPC .............. G06F 40/40 (2020.01); G06F 40/30 (2020.01); G06N 20/00 (2019.01)

(58) Field of Classification Search
CPC .......... G06F 40/40; G06F 40/30; G06N 20/00
See application file for complete search history.

(56) References Cited

U.S. PATENT DOCUMENTS 8,972,414 B2     3/2015  Posse et al.
9,519,684 B2     12/2016 Xu 9,654,425 B2      5/2017  Heiferman et al.
10,007,721 B1 *   6/2018  Klein ..................... G06F 16/358
10,529,004 B2 *   1/2020  Caralis ............... G06Q 30/0631
11,323,493 B1 *   5/2022  Xi ...................... H04M 3/42348
11,356,980 B2 *   6/2022  Tarchala ............. H04W 64/003
11,587,000 B2 *   2/2023  Pinard ................... H04L 67/306
11,930,056 B1 *   3/2024  Ren ........................ H04L 65/403
12,277,609 B1 *   4/2025  Shaw ..................... G06Q 50/01
2017/0109446 A1   4/2017  Wu et al.
(Continued)

OTHER PUBLICATIONS

Amershi, Saleema, James Fogarty, and Daniel S. Weld, "ReGroup: Interactive Machine Learning for On-Demand Group Creation in Social Networks", May 2012, Proceedings of the SIGCHI Conference on Human Factors in Computing Systems, pp. 21-30. (Year: 2012).*

(Continued)

*Primary Examiner* — Daniel C Washburn
*Assistant Examiner* — James Boggs
(74) *Attorney, Agent, or Firm* — Harrity & Harrity, LLP

(57)     ABSTRACT

In some implementations, a conferencing system may receive a set of responses, corresponding to a set of questions, associated with a set of users. The conferencing system may identify, for a first user in the set of users, a subset of matching users in the set of users, based on the set of responses. The conferencing system may output an indication of the subset of matching users. The conferencing system may generate, by applying a machine learning model to the set of responses, at least one suggested cluster for a breakout subset of the set of users. The conferencing system may determine, based on the at least one suggested cluster, at least one possible location. The conferencing system may output an indication of the at least one suggested cluster and the at least one possible location.

20 Claims, 11 Drawing Sheets

(56)                    References Cited

U.S. PATENT DOCUMENTS

| | | | | |
|---|---|---|---|---|
| 2020/0228358 A1* | 7/2020 | Rampton | ............... | G06N 3/006 |
| 2023/0401539 A1* | 12/2023 | Chandra | ............ | G06Q 10/1093 |
| 2025/0005329 A1* | 1/2025 | Roitman | ................ | G06N 3/044 |

OTHER PUBLICATIONS

Li, Ruichang, Honglei Zhu, Liao Fan, and Xuekun Song, "Hybrid Deep Framework for Group Event Recommendation", Jan. 2020, IEEE Access, vol. 8, pp. 4775-4784. (Year: 2020).*

De Pessemier, Toon, Jeroen Minnaert, Kris Vanhecke, Simon Dooms, and Luc Martens, "Social Recommendations for Events", Oct. 2013, 2013 RecSys Workshop in conjunction with the 7th ACM Conference on Recommender Systems. (Year: 2013).*

Hada, Praddumn Singh "AI based Event Management Web Application", May 2022, 2022 International Conference on Machine Learning, Big Data, Cloud and Parallel Computing (COM-IT-CON), vol. 1, pp. 562-566. (Year: 2022).*

Zhang, Jason Shuo, Mike Gartrell, Richard Han, Qin Lv, and Shivakant Mishra, "GEVR: An Event Venue Recommendation System for Groups of Mobile Users", Mar. 2019, Proceedings of the ACM on Interactive, Mobile, Wearable and Ubiquitous Technologies, vol. 3, No. 1, pp. 1-25. (Year: 2019).*

Boutsis, Ioannis, Stavroula Karanikolaou, and Vana Kalogeraki, "Personalized Event Recommendations using Social Networks", Jun. 2015, Proceedings of the 2015 16th IEEE International Conference on Mobile Data Management, vol. 1, pp. 84-93. (Year: 2015).*

Asabere, Nana Yaw, Feng Xia, Wei Wang, Joel Rodrigues, Filippo Basso, and Jianhua Ma, "Improving Smart Conference Participation through Socially-Aware Recommendation", Oct. 2014, IEEE Transactions on Human-Machine Systems, vol. 44, No. 5, pp. 689-700. (Year: 2014).*

"Cvent Attendee Hub: An attendee engagement engine for all your in-person, virtual, and hybrid events," retrieved from https://www.cvent.com/en/event-marketing-management/attendee-hub on Jul. 12, 2023, 17 pages.

* cited by examiner

220
Location
indication

225
Feedback request

Conferencing
system

User
device

200

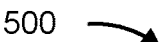

500

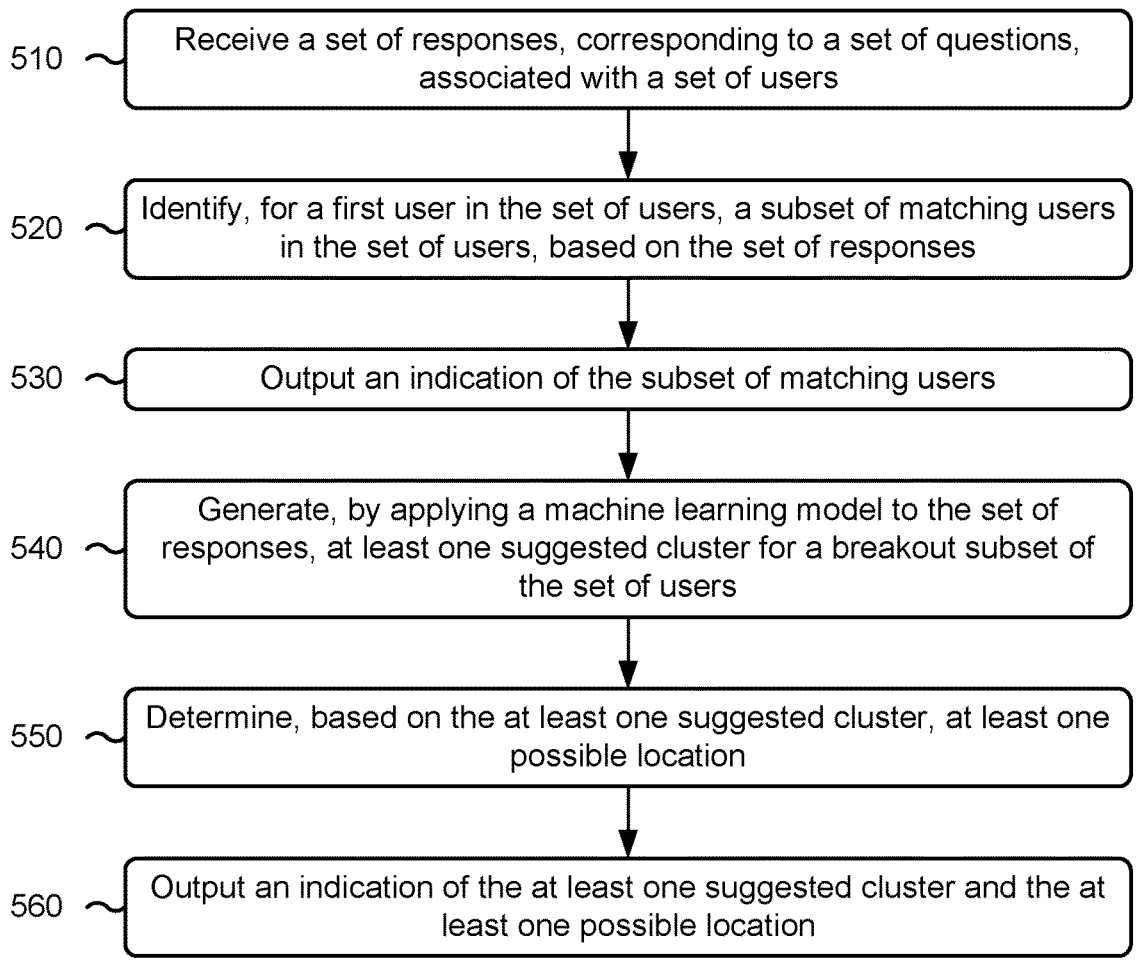

510 — Receive a set of responses, corresponding to a set of questions, associated with a set of users 520 — Identify, for a first user in the set of users, a subset of matching users in the set of users, based on the set of responses 530 — Output an indication of the subset of matching users 540 — Generate, by applying a machine learning model to the set of responses, at least one suggested cluster for a breakout subset of the set of users 550 — Determine, based on the at least one suggested cluster, at least one possible location 560 — Output an indication of the at least one suggested cluster and the at least one possible location

FIG. 5

DYNAMIC QUESTIONS AND CLUSTERS FOR EVENTS

BACKGROUND

A larger event may include a bundle of events. Generally, users consume network overhead, processing resources, and power when submitting a registration for the larger event as well as registrations for events within the bundle.

SUMMARY

Some implementations described herein relate to a system for generating dynamic questions and clusters for events. The system may include one or more memories and one or more processors communicatively coupled to the one or more memories. The one or more processors may be configured to generate, by applying a first machine learning model to a dataset associated with a past bundle of events, a set of questions. The one or more processors may be configured to output the set of questions for a set of users registering for a current bundle of events. The one or more processors may be configured to receive a set of responses, corresponding to the set of questions, associated with the set of users. The one or more processors may be configured to identify, for a first user in the set of users, a subset of matching users in the set of users, based on the set of responses. The one or more processors may be configured to output an indication of the subset of matching users. The one or more processors may be configured to generate, by applying a second machine learning model to the set of responses, at least one suggested cluster for a breakout subset of the set of users. The one or more processors may be configured to output an indication of the at least one suggested cluster.

Some implementations described herein relate to a method of generating dynamic questions and clusters for events. The method may include receiving a set of responses, corresponding to a set of questions, associated with a set of users. The method may include identifying, for a first user in the set of users, a subset of matching users in the set of users, based on the set of responses. The method may include outputting an indication of the subset of matching users. The method may include generating, by applying a machine learning model to the set of responses, at least one suggested cluster for a breakout subset of the set of users. The method may include determining, based on the at least one suggested cluster, at least one possible location. The method may include outputting an indication of the at least one suggested cluster and the at least one possible location.

Some implementations described herein relate to a non-transitory computer-readable medium that stores a set of instructions for responding to questions and clusters for events. The set of instructions, when executed by one or more processors of a device, may cause the device to transmit at least one response corresponding to at least one question. The set of instructions, when executed by one or more processors of the device, may cause the device to receive an indication of at least one user, suggested for networking, based on the at least one response. The set of instructions, when executed by one or more processors of the device, may cause the device to receive an invitation to a chat room associated with a cluster of users based on the at least one response. The set of instructions, when executed by one or more processors of the device, may cause the device to transmit feedback associated with a first event in a bundle of events. The set of instructions, when executed by one or more processors of the device, may cause the device to receive an indication of a second event, in the bundle of events, based on the feedback and the at least one user suggested for networking.

BRIEF DESCRIPTION OF THE DRAWINGS

FIG. 5 is a flowchart of an example process relating to dynamic questions and clusters for events, in accordance with some embodiments of the present disclosure.

DETAILED DESCRIPTION

Figure 1A:
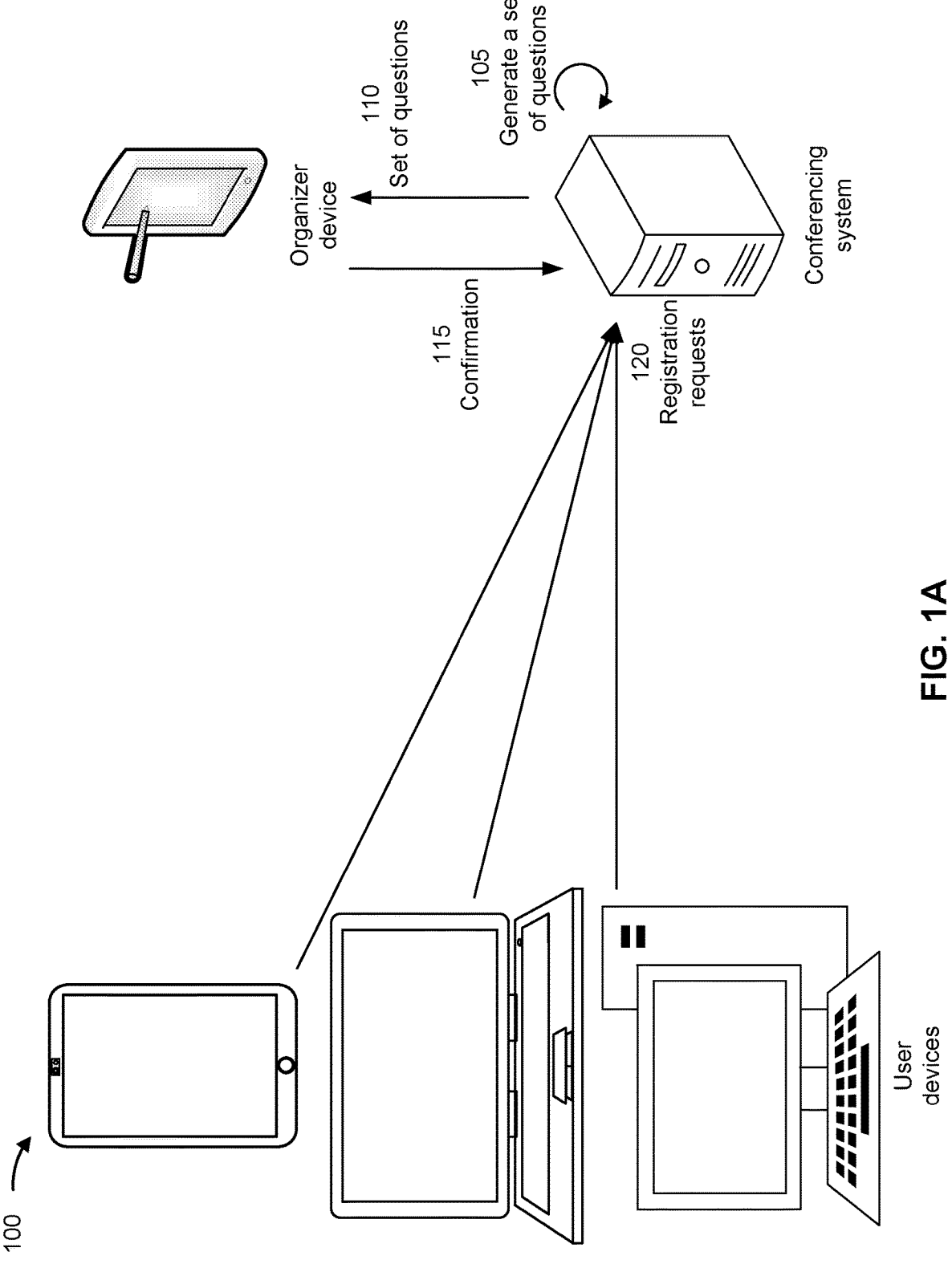
FIGS. 1A-1D are diagrams of an example implementation relating to dynamic questions and clusters before a bundle of events, in accordance with some embodiments of the present disclosure.

The following detailed description of example implementations refers to the accompanying drawings. The same reference numbers in different drawings may identify the same or similar elements.

A convention or a conference, among other examples, may include a bundle of events. An attendee may register for the convention on a user device, such that the registration process consumes power, processing resources, and network overhead. In order to help an attendee further register for particular events, in the bundle of events, an organizer device may transmit follow-up questions to the user device for response. However, this consumes additional network overhead as well as additional power and processing resources at the user device.

Some implementations described herein enable a machine learning model to recommend a set of questions for use in a registration process. As a result, an organizer device may receive responses to the set of questions (e.g., for recommending particular events to attend and/or fellow attendees with whom to network) during the registration process. Thus, the machine learning model helps conserve network overhead, power, and processing resources that would otherwise have been wasted in transmitting follow-up questions after the registration process.

A chat room may be provided to attendees for a convention in advance of the bundle of events. Accordingly, attendees may attempt to network before the convention. However, chat rooms that go unused waste power and processing resources in creating and maintaining the chat rooms. Additionally, user devices consume network overhead whenever an attendee sends chats to a large group of other attendees.

Some implementations described herein enable a machine learning model to identify groups of attendees for networking. Accordingly, an organizer device may provision chat rooms, in advance of a larger event, for the groups of attendees. As a result, the chat rooms are less likely to go unused, which helps conserve power and processing resources that would otherwise have been wasted in creating and maintaining unused chat rooms. Additionally, attendee chats are transmitted to targeted groups of attendees, which conserves network overhead as compared with attendee chats being transmitted to everyone (or to non-targeted groups of attendees).

When attendees change their minds about which events, in the bundle of events, to attend, locations for the events may be underfilled or overfilled. Overfilled rooms waste power and processing resources because too many user devices in the overfilled rooms cause network congestion. For some telecommunications networks, overfilled rooms may result in network outages due to excessive network congestion.

Some implementations described herein enable a machine learning model to recommend a location change for an event within a bundle of events. As a result, the location change reduces chances that a room will be overfilled. Fewer overfilled rooms results in less network congestion and, for some telecommunications networks, prevents network outages due to excessive network congestion.

FIGS. 1A-1D are diagrams of an example 100 associated with dynamic questions and clusters before a bundle of events. As shown in FIGS. 1A-1D, example 100 includes user devices, a conferencing system, and an organizer device. These devices are described in more detail in connection with FIGS. 3 and 4.

As shown in FIG. 1A and by reference number 105, the conferencing system may generate a set of questions. The conferencing system may generate the set of questions in response to a request from the organizer device. For example, the organizer device may transmit a command to generate the set of questions based on input from a user of the organizer device.

The conferencing system may apply a first machine learning model to generate the set of questions. For example, the conferencing system may provide a dataset, associated with a past bundle of events, as input to the first machine learning model and may receive the set of questions as output from the first machine learning model. The dataset may include properties associated with attendees to the past bundle of events (e.g., job titles, employer names, demographic information, socioeconomic information, among other examples) associated with indications of which events, in the past bundle of events, the attendees attended. Additionally, or alternatively, the dataset may include surveys answered by attendees to the past bundle of events (e.g., scores or other numeric indicators associated with events in the past bundle of events, letter grades or other category indicators associated with events in the past bundle of events, and/or written comments from the attendees, whether associated with the past bundle of events as a whole or with specific events in the past bundle of events, among other examples). The conferencing system may receive the dataset from the organizer device and/or may transmit a request for the dataset to a storage device indicated by the organizer device (e.g., the storage device being at least partially separate from the organizer device and the conferencing system).

The first machine learning model may recommend the set of questions from a larger set of possible questions. Additionally, or alternatively, the first machine learning model may use natural language processing (NLP) to generate the set of questions based on the dataset. For example, the first machine learning model may include a large language model (LLM) with generative pre-transformers (GPTs) that generate inquiries about repeating some events from the past bundle of events, refraining from repeating some events from the past bundle of events, and/or adding events that were absent from the past bundle of events.

In some implementations, the first machine learning model may include a regression algorithm (e.g., linear regression or logistic regression), which may include a regularized regression algorithm (e.g., Lasso regression, Ridge regression, or Elastic-Net regression). Additionally, or alternatively, the first machine learning model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., historical digital files associated with the entity). For example, for a regression algorithm, a model parameter may include a regression coefficient (e.g., a weight). For a decision tree algorithm, a model parameter may include a decision tree split location, as an example.

Additionally, the conferencing system may use one or more hyperparameter sets to tune the first machine learning model. A hyperparameter may include a structural parameter that controls execution of a machine learning algorithm, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the first machine learning model may be a clustering model that groups similar attendees and/or similar events of the past bundle of events together. Accordingly, the conferencing system may generate a question, in the set of questions, based on a cluster with one type of attendees (e.g., a question about how relevant the past bundle of events was to that type of attendee) and/or based on a cluster with one type of event (e.g., a question about whether that type of event, in the past bundle of events, should be repeated).

As shown by reference number 110, the conferencing system may transmit, and the organizer device may receive, the set of questions. Additionally, as shown by reference number 115, the organizer device may transmit, and the conferencing system may receive, a confirmation of the set of questions. For example, the organizer device may transmit the confirmation based on input from the user of the organizer device. Accordingly, the user of the organizer device may review the set of questions before the set of questions are sent to registering users (e.g., as described below in connection with FIG. 1B). In some implementations, the organizer device may transmit an indication of modifications (e.g., one or more modifications) to the set of questions. Accordingly, the conferencing system may apply the modifications to the set of questions such that a modified set of questions are sent to registering users.

As shown by reference number 120, the user devices (e.g., associated with a set of users registering for a current bundle of events) may transmit, and the conferencing system may receive, registration requests. For example, web browsers executed by the user devices may navigate to a website hosted by (or at least associated with) the conferencing system, based on input from users of the user devices (e.g., input indicating the website). Accordingly, the users of the user devices may interact with user interfaces (UIs) generated by the web browsers to trigger the user devices to transmit the registration requests. Although the example 100 shows the registration requests as simultaneous, other examples may include the conferencing system receiving the registration requests over time (e.g., a first registration request at a first time, a second registration request at a second time after the first time, and so on).

Figure 1B:
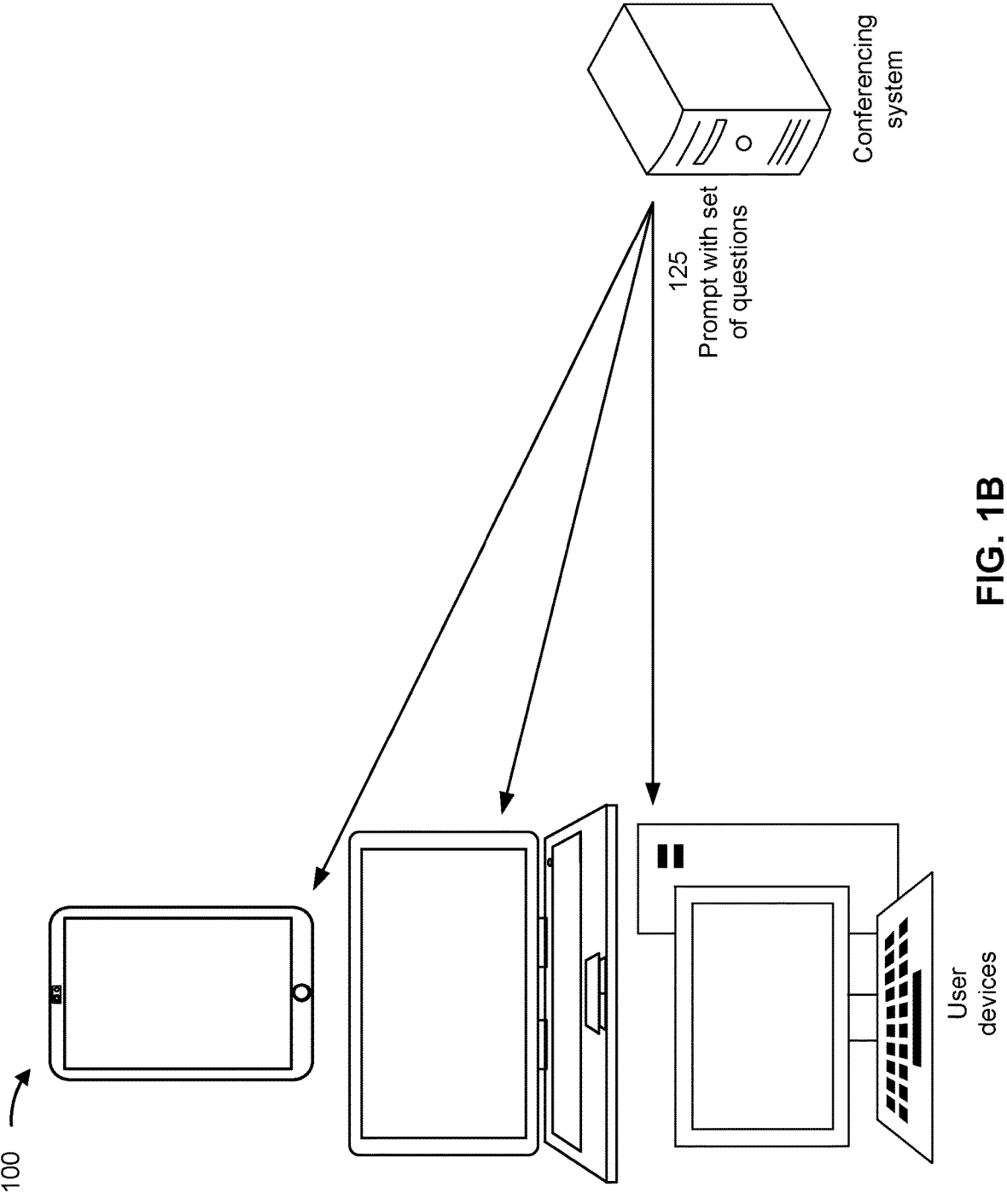

As shown in FIG. 1B and by reference number 125, the conferencing system may transmit, and the user devices may receive, prompts with the set of questions. Accordingly, the conferencing system may output the set of questions for the users who are registering for the current bundle of events. The user devices may output the prompts in the web browsers described above or as push notifications, among other examples. In some implementations, the conferencing system may transmit the prompts to email addresses (e.g., included in email messages) and/or phone numbers (e.g., included in text messages) associated with the user devices. Although the example 100 shows the prompts as simultaneous, other examples may include the conferencing system transmitting the prompts over time (e.g., in response to registration requests received over time, as described above).

Figure 1C:
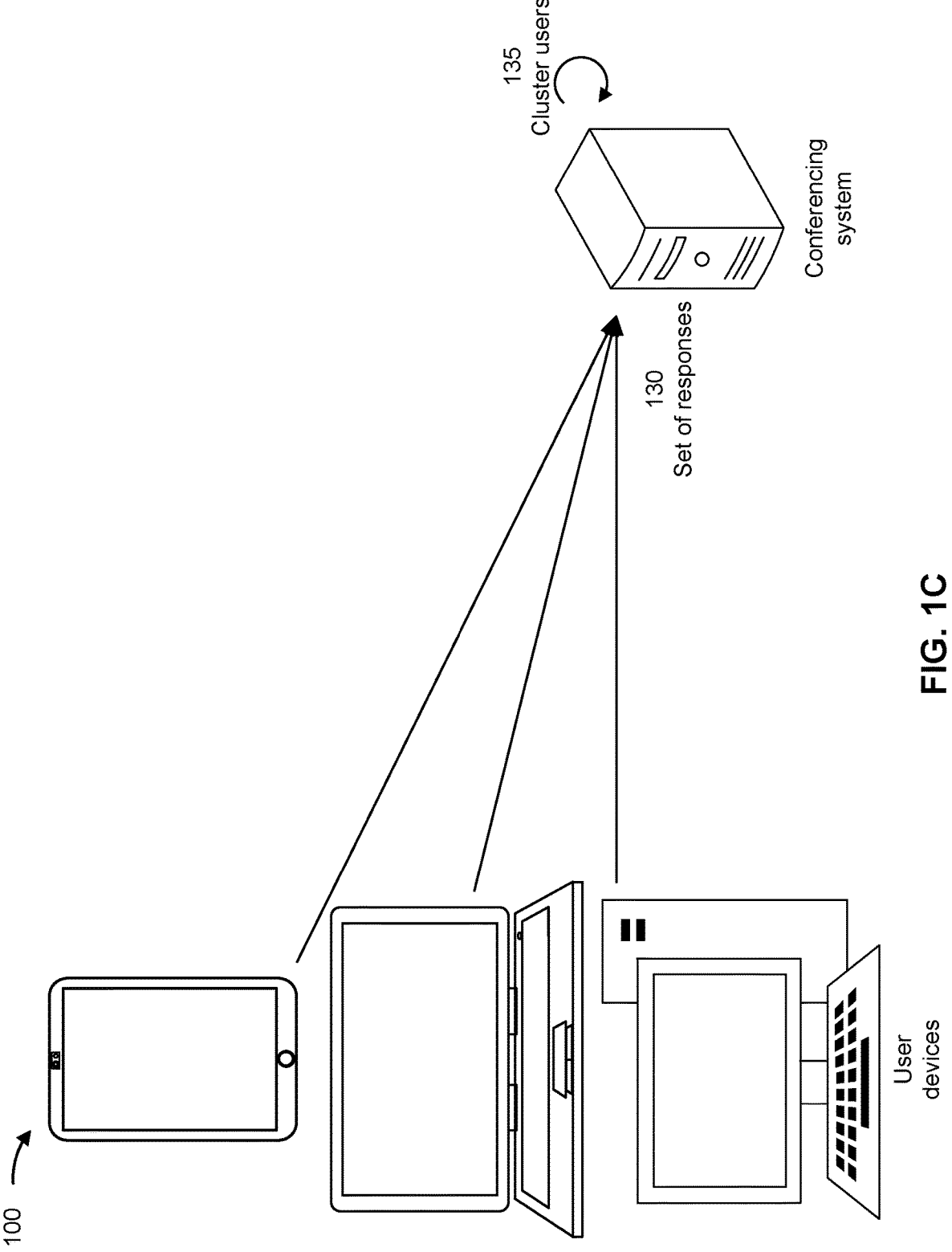

As shown in FIG. 1C and by reference number 130, the user devices may transmit, and the conferencing system may receive, a set of responses corresponding to the set of questions. For example, each user device may transmit responses (e.g., at least one response) to questions (e.g., at least one question) in the set of questions. The users of the user devices may interact with UIs, generated based on the prompts, to trigger the user devices to transmit the set of responses. Because some users of the user devices may skip some questions and/or some questions may be irrelevant for some users, different user devices may transmit different quantities of responses. Although the example 100 shows the responses as simultaneous, other examples may include the conferencing system receiving the responses over time (e.g., in response to prompts transmitted over time, as described above).

Because the conferencing system transmits the set of questions during a registration procedure associated with the current bundle of events, the set of responses corresponding to the set of questions are received during the registration procedure. Thus, the first machine learning model helps conserve network overhead, power, and processing resources that would otherwise have been wasted in transmitting the set of questions (and receiving the set of responses) after the registration procedure.

As shown by reference number 135, the conferencing system may cluster the set of users (who registered for the current bundle of events). The conferencing system may apply a second machine learning model to group the set of users. For example, the conferencing system may provide the set of responses, associated with the set of users, as input to the second machine learning model and may receive indications of clusters of users as output from the second machine learning model. The second machine learning model may be trained and deployed similarly as described above for the first machine learning model.

Accordingly, the conferencing system may determine, for a first user in the set of users, a subset of matching users in the set of users. The matching users may include other users in a same cluster. Additionally, or alternatively, the matching users may include other users that are a distance away from the first user, in a graph representation generated by the second machine learning model, that satisfies a matching threshold. The conferencing system may output an indication of the subset of matching users. For example, the conferencing system may transmit the indication to the organizer device. Additionally, or alternatively, the conferencing system may transmit the indication to the user device associated with the first user. Accordingly, the user device, associated with the first user, may receive an indication of matching users (e.g., at least one matching user) that are suggested for networking. The indication may include names, usernames, email addresses, and/or phone numbers associated with the matching users. Additionally, or alternatively, the indication may include, for each matching user, a list of events within the current bundle of events that the matching user plans to attend.

Figure 1D:
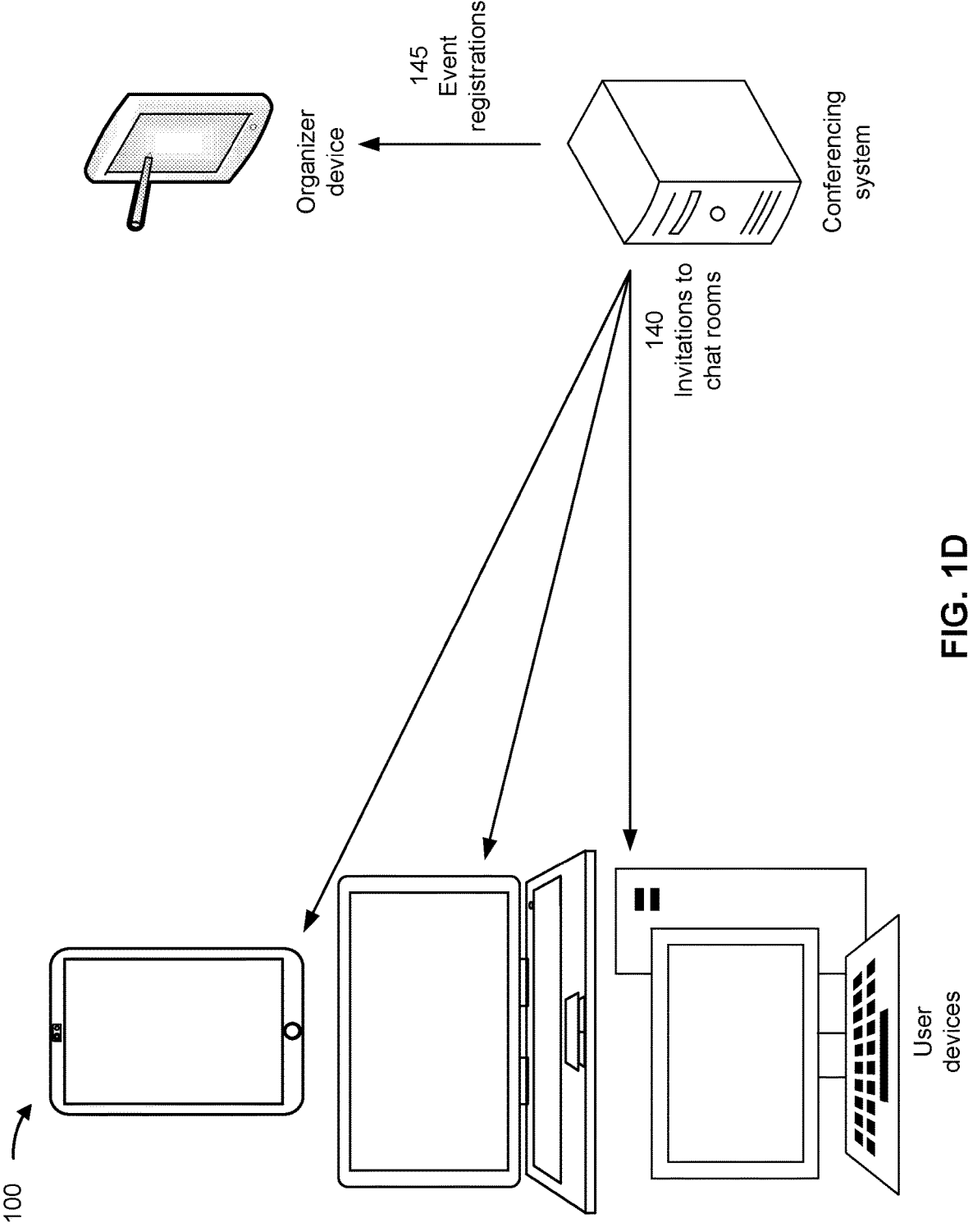

As shown in FIG. 1D and by reference number 145, the conference system may transmit, and the organizer device may receive, a set of event registrations. For example, the set of event registrations may include indications of the set of users (e.g., names, usernames, email addresses, and/or phone numbers, among other examples); indications of which events, in the current bundles of events, each user plans to attend; and/or indications of the clusters (or groups) of users, among other examples.

As shown by reference number 140, the conferencing system may output invitations to chat rooms associated with the clusters (or groups) of users. The conferencing system may create (and maintain) a chat room for each group of users. For example, the conferencing system may transmit, and the user device associated with the first user may receive, an invitation for a chat room associated with the subset of matching users (e.g., a cluster including the subset). Each invitation may be transmitted to a user in the set of users and may include a link (e.g., a hyperlink) to the chat room associated with the cluster including the user. The conferencing system may use an external device (e.g., a chat service device) to maintain the chat rooms and thus may transmit commands to the external device to create the chat rooms.

Because the chat rooms are based on the clusters (or groups) of users, the chat rooms are less likely to go unused, which helps conserve power and processing resources that would otherwise have been wasted in creating and maintaining unused chat rooms. Additionally, chats from the first user are transmitted to the subset of matching users, which conserves network overhead as compared with the chats being transmitted to everyone (or to a random group of users).

The process described in connection with FIGS. 1C-1D may be iterative. For example, the registration procedure may last for days or weeks. Accordingly, the conferencing system may periodically perform clustering in order to determine clusters (or groups) for users who registered later than the original set of users. Additionally, the conferencing system may add users who registered later to existing chat rooms and/or may create new chat rooms.

Although the example 100 is described in connection with the organizer device being separate from the conferencing system, other examples may include the organizer device being at least partially integrated (e.g., virtually, logically, and/or physically) with the conferencing system. Accordingly, operations described as performed by the conferencing system may additionally, or alternatively, be performed by the organizer device.

By using techniques as described in connection with FIGS. 1A-1D, the first machine learning model helps conserve network overhead, power, and processing resources that would otherwise have been wasted in transmitting the set of questions (and receiving the set of responses) after the registration procedure. Additionally, the second machine learning model clusters the set of users such that the chat rooms are less likely to go unused, which helps conserve power and processing resources that would otherwise have been wasted in creating and maintaining unused chat rooms. Additionally, chats from one user are transmitted to matching users, which conserves network overhead as compared with chats being transmitted to everyone (or to random groups of users).

As indicated above, FIGS. 1A-1D are provided as an example. Other examples may differ from what is described with regard to FIGS. 1A-1D.

FIGS. 2A-2D are diagrams of an example 200 associated with dynamic clusters during a bundle of events. As shown in FIGS. 2A-2D, example 200 includes a user device, a conferencing system, and an organizer device. These devices are described in more detail in connection with FIGS. 3 and 4.

The user device shown in the example 200 may be associated with a first user attending a current bundle of events. The user device may have received an indication of a subset of matching users for the first user, as described in connection with FIGS. 1C-1D. While operations described in connection with FIGS. 1A-1D occurred during a registration procedure, operations described in connection with FIGS. 2A-2D may occur during the current bundle of events.

Figure 2A:
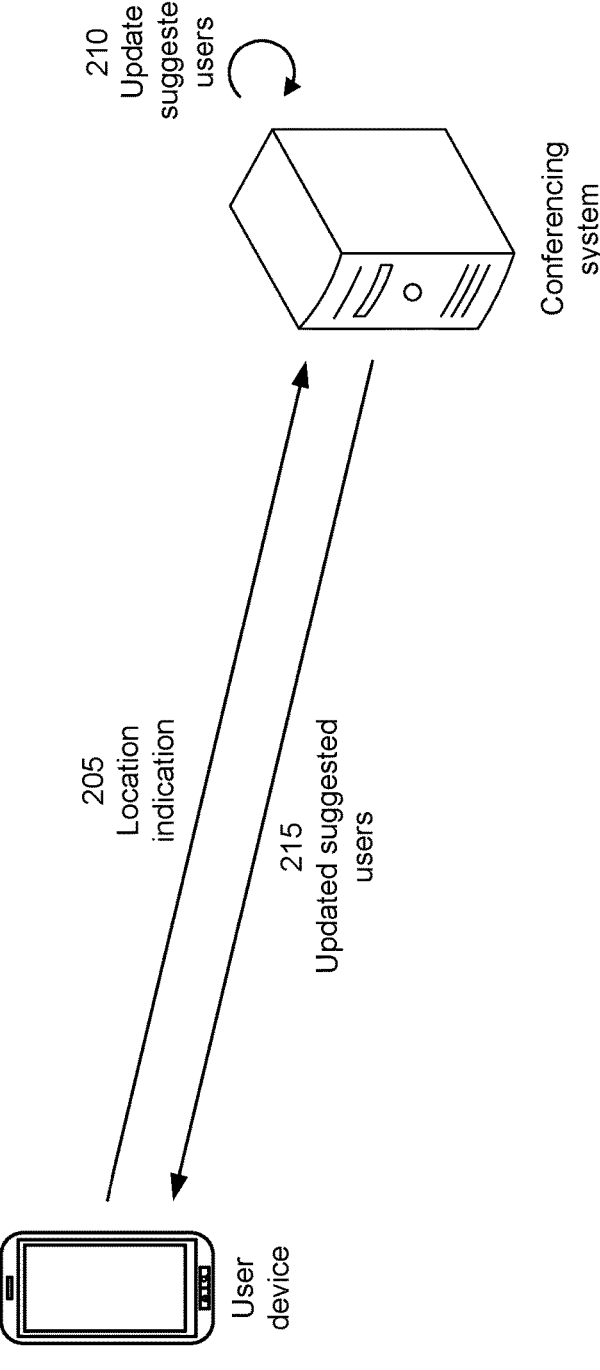
FIGS. 2A-2D are diagrams of an example implementation relating to dynamic clusters during a bundle of events, in accordance with some embodiments of the present disclosure.

As shown in FIG. 2A and by reference number 205, the user device may transmit, and the conferencing system may receive, an indication of a location associated with the user device. For example, the user device may execute an application (e.g., a mobile "app") that communicates with the conferencing system. Accordingly, the application may have permission (e.g., from the first user of the user device via an operating system (OS) of the user device) to indicate (e.g., periodically according to a schedule) the location associated with the user device. The location may be determined using a global navigation satellite system (GNSS), such as the global positioning system (GPS).

The location may be associated with a user suggested for networking (e.g., at least one user in the subset of matching users, also referred to as a "second user" hereafter). Accordingly, the conferencing system may determine that the user device, associated with the first user, was near an additional device, associated with the second user, for an amount of time (e.g., an amount of time satisfying a networking threshold). For example, the conferencing system may receive the indication of the location associated with the user device as well as an indication of a location associated with the additional device. Therefore, the conferencing system may compare the locations to determine that the user device, associated with the first user, was near (e.g., within a distance that satisfies a closeness threshold) the additional device, associated with the second user.

Additionally, or alternatively, the location may be associated with an event in the current bundle of events. Accordingly, the conferencing system may determine that the user device, associated with the first user, was near a location associated with the event in the current bundle of events (e.g., during a time period that is associated with occurrence of the event). For example, the conferencing system may determine that the first user attended the event by determining that the location of the user device, associated with the first user, was near (e.g., within a distance that satisfies an attendance threshold) the location associated with the event.

As shown by reference number 210, the conferencing system may update the subset of matching users (e.g., users suggested for networking) for the first user. For example, the conferencing system may determine an additional user (e.g., at least one additional user) suggested for networking based on the amount of time (e.g., based on the first user networking for the amount of time with the second user) and/or based on attendance at the event. In some implementations, the conferencing system may identify a third user, suggested for networking with the second user, and suggest the third user for networking with the first user. Additionally, or alternatively, the conferencing system may provide information, associated with the second user, as input to a second machine learning model (e.g., as described in connection with FIG. 1C) and may receive an indication of the additional user as output from the second machine learning model. Similarly, the conferencing system may provide information, associated with the event that the first user attended, as input to the second machine learning model and may receive an indication of the additional user as output from the second machine learning model.

As shown by reference number 215, the conferencing system may transmit, and the user device may receive, an indication of the additional user. Accordingly, the user device, associated with the first user, may receive an indication of the additional user that is suggested for networking. The indication may include a name, a username, an email address, and/or a phone number associated with the additional user. Additionally, or alternatively, the indication may include a list of events, within the current bundle of events, that the additional user plans to attend. Similarly, the conferencing system may add the additional user to a chat room that includes the first user.

Although the example 100 is described in connection with the conferencing system adding the additional user as suggested for networking, other examples may additionally, or alternatively, include the conferencing system removing a user, in the subset of matching users, based on the amount of time (e.g., based on the first user networking for the amount of time with the second user) and/or based on attendance at the event. Accordingly, the conferencing system may transmit an instruction to the user device to discard information associated with the removed user. Similarly, the conferencing system may boot the removed user from a chat room that includes the first user.

Figure 2B:
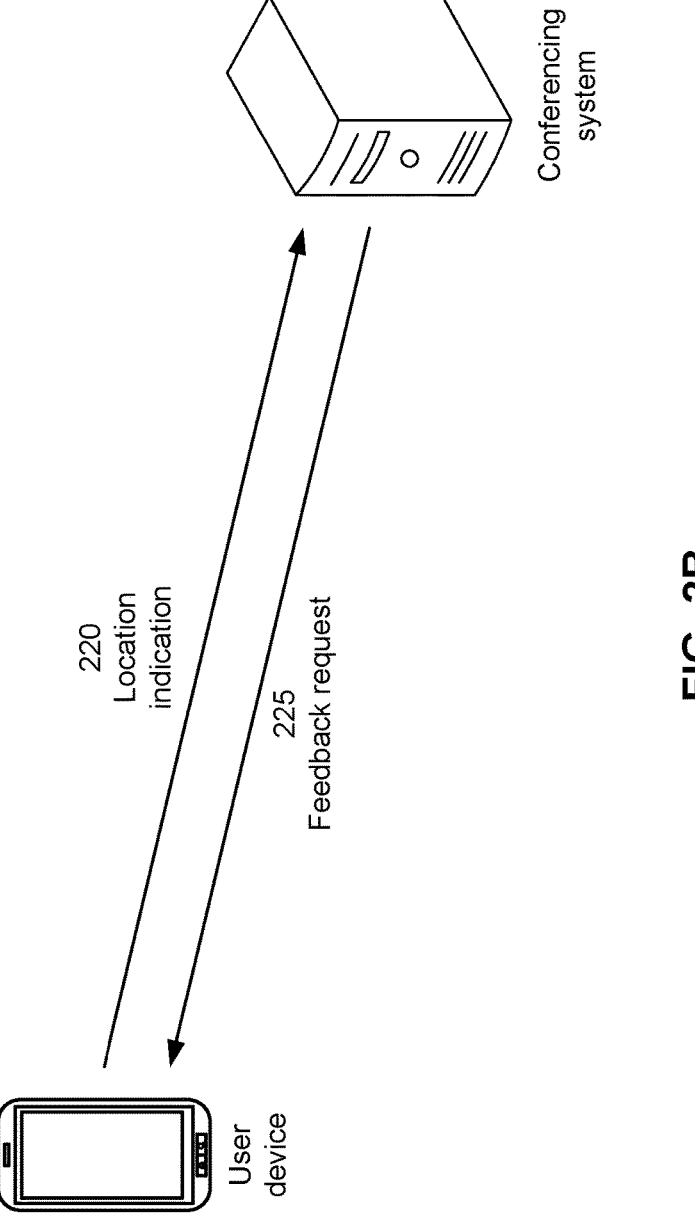

As shown in FIG. 2B and by reference number 220, the user device may transmit, and the conferencing system may receive, an indication of a location associated with the user device. The location may be associated with an event in the current bundle of events. Accordingly, as shown by reference number 225, the conferencing system may transmit, and the user device may receive, a request for feedback (associated with the event) in response to the indication of the location. The user device may output the request in a web browser executed by the user device or as a push notification, among other examples. In some implementations, the conferencing system may transmit the request to an email address (e.g., included in an email message) and/or a phone number (e.g., included in a text message) associated with the user device. Because the conferencing system transmits requests only to user devices associated with locations that indicate attendance at the event, the conferencing system conserves network overhead as compared with transmitting requests to all attendees (or including the request in a larger survey transmitted at an end of the current bundle of events).

Figure 2C:
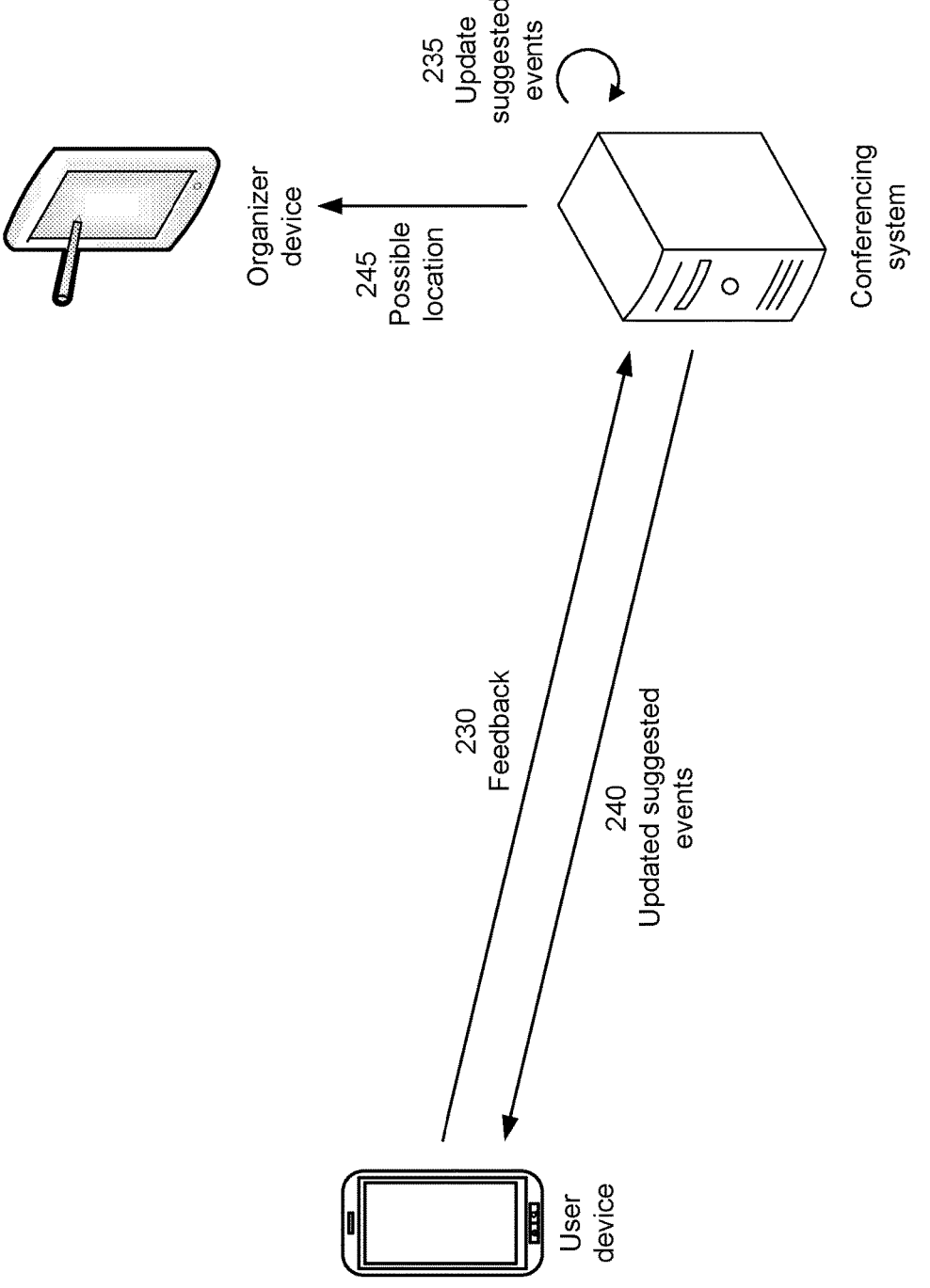

As shown in FIG. 2C and by reference number 230, the user device may transmit, and the conferencing system may receive, feedback associated with the event. The user device may transmit the feedback in response to the request from the conferencing system described above. The first user of the user device may interact with a UI, generated based on the request, to trigger the user device to transmit the feedback. The feedback may include a score (or another numeric indicator) associated with the event, a letter grade (or another category indicator) associated with the event, and/or written comments associated with the event, among other examples.

As shown by reference number 235, the conferencing system may update a list of events, in the current bundle of events, suggested for the first user. The conferencing system may apply a third machine learning model to the feedback and/or the subset of matching users (e.g., suggested for networking) associated with the first user. For example, the conferencing system may provide the feedback and/or indications of the subset of matching users as input to the third machine learning model and may receive an indication of an additional event as output from the third machine learning model. The third machine learning model may be trained and deployed similarly as described above for the first machine learning model in FIG. 1A.

Accordingly, the conferencing system may recommend the additional event for the first user to attend based on whether the first user enjoyed the event, as indicated in the feedback. Additionally, or alternatively, the conferencing system may recommend the additional event for the first user to attend based on one of the users, suggested for networking, being registered for the additional event. Similarly, the conferencing system may determine an additional event for the first user to skip based on whether the first user enjoyed the event, as indicated in the feedback. For example, the first user may have previously registered for the additional event, but the third machine learning model may recommend that the additional event be skipped (e.g., because the first user disliked the event that was similar to the additional event).

As shown by reference number 240, the conferencing system may transmit, and the user device may receive, an indication of an additional event, in the current bundle of events, to attend, and/or an indication to skip an additional event in the current bundle of events. The user device may output the indication(s) in a web browser executed by the user device or as a push notification, among other examples. In some implementations, the conferencing system may transmit the indication(s) to an email address (e.g., included in an email message) and/or a phone number (e.g., included in a text message) associated with the user device.

In some implementations, as shown by reference number 245, the conferencing system may transmit, and the organizer device may receive, an indication of a possible location for an additional event in the current bundle of events. The organizer device may output the indication in a web browser executed by the organizer device or as a push notification, among other examples. In some implementations, the conferencing system may transmit the indication to an email address (e.g., included in an email message) and/or a phone number (e.g., included in a text message) associated with the organizer device.

In some implementations, the conferencing system may identify a change in registration associated with the additional event. For example, the user device may transmit, and the conferencing system may receive, a confirmation associated with the additional event (e.g., in response to the indication of the additional event, in the current bundle of events, to attend, as described above) or a cancellation associated with the additional event (e.g., in response to the indication to skip the additional event in the current bundle of events, as described above). Accordingly, the conferencing system may identify (and output) the possible location based on the change in registration (e.g., by adding the first user or removing the first user from an attendance list).

The conferencing system may further transmit an indication of the possible location to the user device (and user devices associated with other attendees registered for the additional event). For example, the organizer device may transmit, and the conferencing system may receive, a confirmation of the possible location (e.g., a user of the organizer device may interact with a UI, generated based on the indication of the possible location, to trigger the organizer device to transmit the confirmation). Accordingly, the user device may receive the indication of the possible location in response to a confirmation associated with the additional event, as described above. User devices associated with other attendees may receive the indication of the possible location as an update (e.g., via push notifications, email messages, and/or text messages, among other examples).

In some implementations, the conferencing system may update the subset of matching users (e.g., users suggested for networking) for the first user. For example, the conferencing system may determine an additional user (e.g., at least one additional user) suggested for networking based on the feedback associated with the event (e.g., the additional user provided similar feedback for the same event). Additionally, or alternatively, the conferencing system may provide the feedback as input to the second machine learning model (e.g., as described in connection with FIG. 1C) and may receive an indication of the additional user as output from the second machine learning model.

Figure 2D:
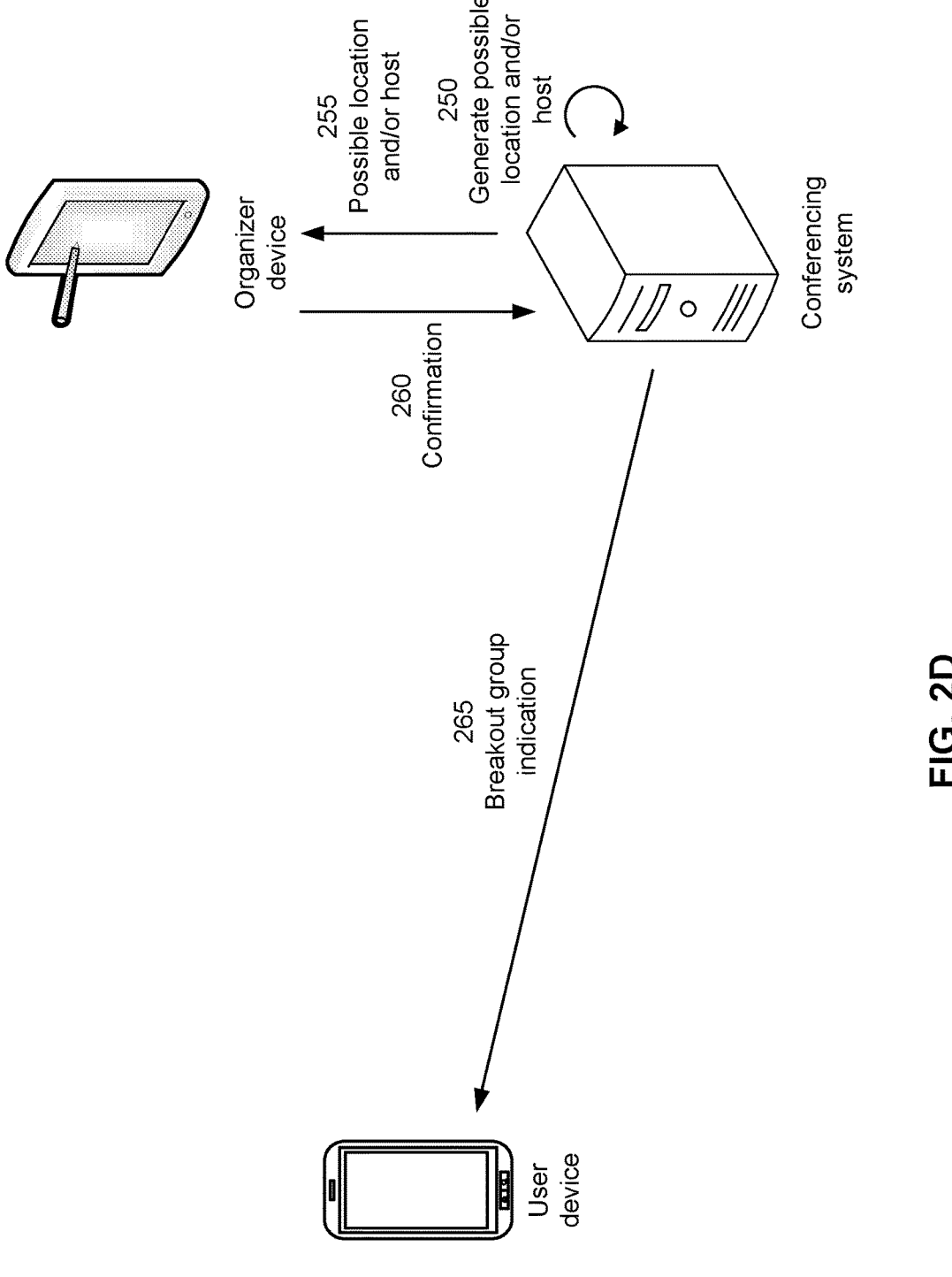

The conferencing system may additionally use clusters of users (e.g., identified via the second machine learning model, as described in connection with FIG. 1C) to determine breakout subsets of users (from a larger set of users attending the current bundle of events). Accordingly, as shown in FIG. 2D and by reference number 250, the conferencing system may determine a possible location (e.g., at least one possible location) for each breakout subset of users. For example, the conferencing system may determine the possible location based on a size of the corresponding breakout subset of users. Additionally, or alternatively, the conferencing system may determine a possible host (e.g., at least one possible host) for each breakout subset of users. For example, the second machine learning model may cluster users by properties, and the conferencing system may determine the possible host based on comparing properties associated with the possible host and properties associated with the cluster of the breakout subset of users.

As shown by reference number 255, the conferencing system may transmit, and the organizer device may receive, an indication of the possible location and/or the possible host for each breakout subset of users. The organizer device may output the indication in a web browser executed by the organizer device or as a push notification, among other examples. In some implementations, the conferencing system may transmit the indication to an email address (e.g., included in an email message) and/or a phone number (e.g., included in a text message) associated with the organizer device.

As shown by reference number 260, the organizer device may transmit, and the conferencing system may receive, a confirmation of the possible location and/or the possible host. For example, a user of the organizer device may interact with a UI, generated based on the indication of the possible location and/or the possible host, to trigger the organizer device to transmit the confirmation.

As shown by reference number 265, the conferencing system may transmit, and the user device may receive, an indication of a cluster (e.g., at least one suggested cluster) for a breakout subset of users that includes the first user. Accordingly, the user device, associated with the first user, may receive an indication of the breakout subset of users. The indication may include names, usernames, email addresses, and/or phone numbers associated with the breakout subset of users. Additionally, the indication may include the possible location and/or the possible host for the breakout session. Alternatively, the user device may transmit, and the conference system may receive, a confirmation associated with a breakout session of the breakout subset of users; therefore, the conference system may transmit, and the user device may receive, an indication of the possible location and/or the possible host in response to the confirmation associated with the breakout session. Accordingly, the conferencing system conserves network overhead by transmitting the possible location and/or the possible host only to user devices associated with users planning to attend the breakout session.

By using techniques as described in connection with FIGS. 2A-2D, the conferencing system suggests the possible location for the additional event within the current bundle of events. As a result, a room for the additional event is less likely to be overfilled. A room that is not overfilled results in less network congestion and, for some telecommunications networks, prevents a network outage due to excessive network congestion.

As indicated above, FIGS. 2A-2D are provided as an example. Other examples may differ from what is described with regard to FIGS. 2A-2D.

Figure 3:
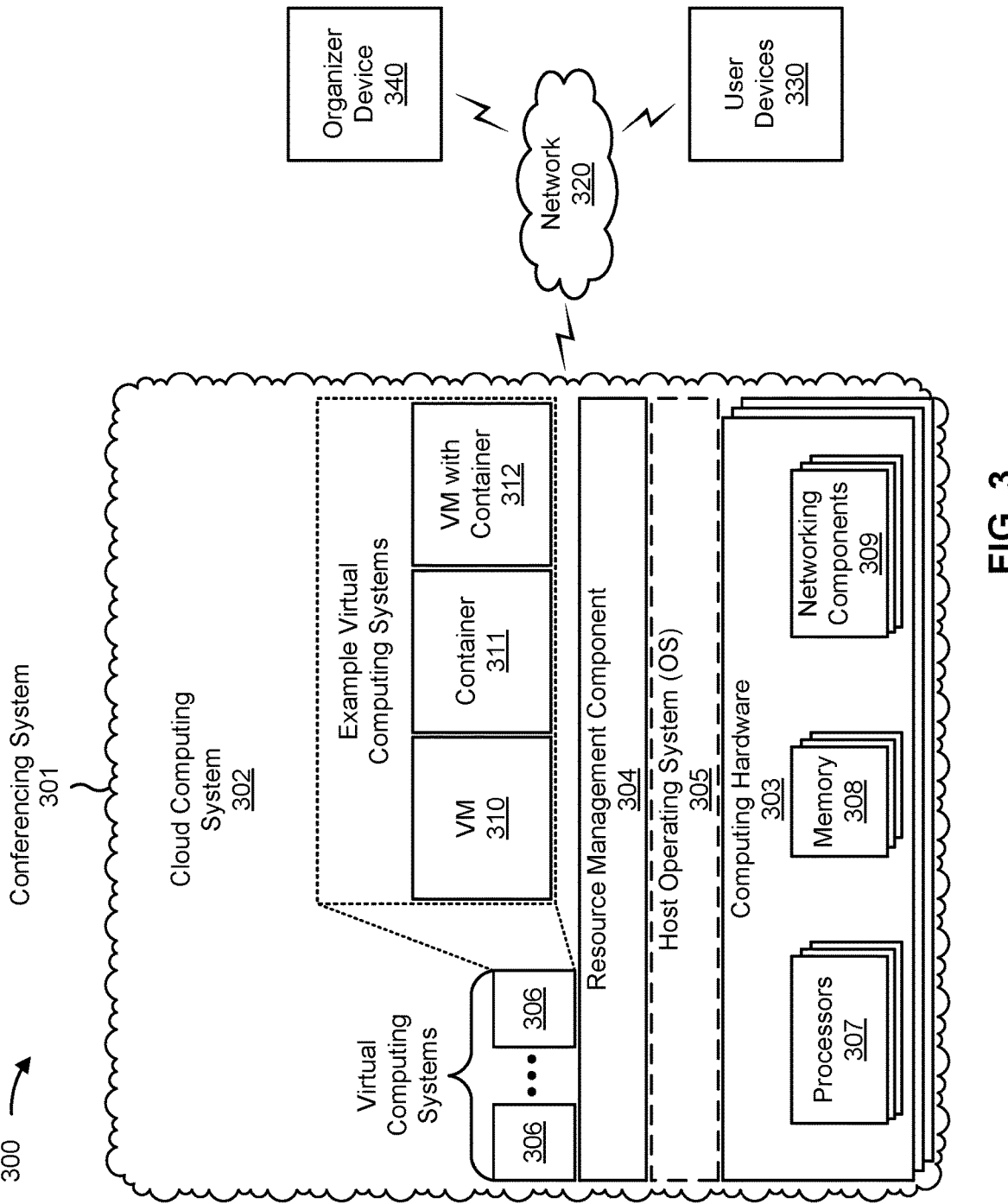
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a conferencing system 301, which may include one or more elements of and/or may execute within a cloud computing system 302. The cloud computing system 302 may include one or more elements 303-312, as described in more detail below. As further shown in FIG. 3, environment 300 may include a network 320, user devices 330, and/or an organizer device 340. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the conferencing system 301 may include one or more elements 303-312 of the cloud computing system 302, may execute within the cloud computing system 302, and/or may be hosted within the cloud computing system 302, in some implementations, the conferencing system 301 may not be cloud-based (e.g., may be implemented outside of a cloud computing system) or may be partially cloud-based. For example, the conferencing system 301 may include one or more devices that are not part of the cloud computing system 302, such as device 400 of FIG. 4, which may include a standalone server or another type of computing device. The conferencing system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user devices 330 may include devices capable of receiving, generating, storing, processing, and/or providing information associated with bundles of events, as described elsewhere herein. The user devices 330 may include communication devices and/or computing devices. For example, the user devices 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The organizer device 340 may include one or more devices capable of receiving, generating, storing, processing, and/or providing information associated with bundles of events, as described elsewhere herein. The organizer device 340 may include a communication device and/or a computing device. For example, the organizer device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
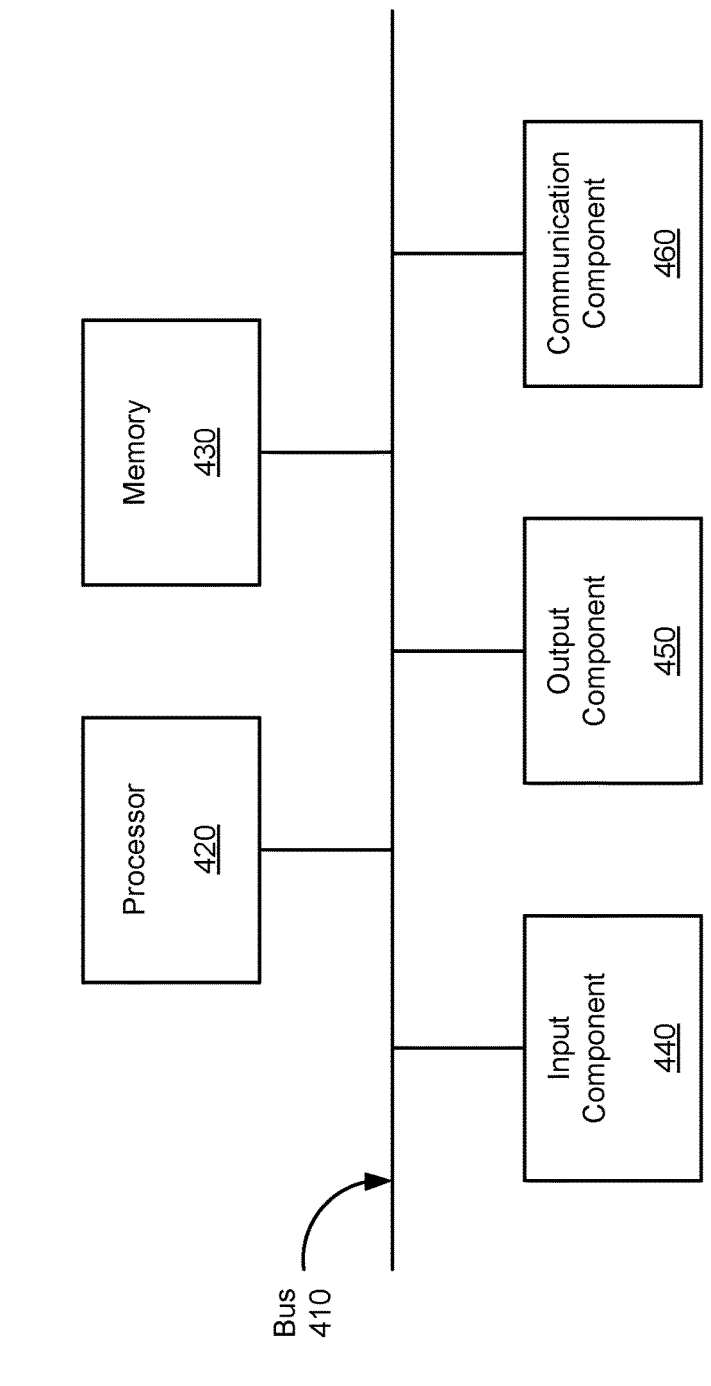
FIG. 4 is a diagram of example components of one or more devices of FIG. 3, in accordance with some embodiments of the present disclosure.

FIG. 4 is a diagram of example components of a device 400 associated with dynamic questions and clusters for events. The device 400 may correspond to a user device 330 and/or an organizer device 340. In some implementations, a user device 330 and/or an organizer device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with dynamic questions and clusters for events. In some implementations, one or more process blocks of FIG. 5 may be performed by the conferencing system 301. In some implementations, one or more process blocks of FIG. 5 may be performed by another device or a group of devices separate from or including the conferencing system 301, such as a user device 330 and/or an organizer device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a set of responses, corresponding to a set of questions, associated with a set of users (block 510). For example, the conferencing system 301 (e.g., using processor 420, memory 430, input component 440, and/or communication component 460) may receive a set of responses, corresponding to a set of questions, associated with a set of users, as described above in connection with reference number 130 of FIG. 1C. As an example, users may interact with UIs, generated based on the set of questions, to trigger user devices to transmit the set of responses to the conferencing system 301.

As further shown in FIG. 5, process 500 may include identifying, for a first user in the set of users, a subset of matching users in the set of users, based on the set of responses (block 520). For example, the conferencing system 301 (e.g., using processor 420 and/or memory 430) may identify, for a first user in the set of users, a subset of matching users in the set of users, based on the set of responses, as described above in connection with reference number 135 of FIG. 1C. As an example, the conferencing system 301 may apply a machine learning model to cluster the set of users. For example, the conferencing system 301 may provide the set of responses, associated with the set of users, as input to the machine learning model and may receive an indication of the subset of matching users as output from the machine learning model.

As further shown in FIG. 5, process 500 may include outputting an indication of the subset of matching users (block 530). For example, the conferencing system 301 (e.g., using processor 420, memory 430, and/or output component 450) may output an indication of the subset of matching users, as described above in connection with FIG. 1C. As an example, the indication may include names, usernames, email addresses, and/or phone numbers associated with the subset of matching users. Additionally, or alternatively, the indication may include, for each matching user, a list of events within a current bundle of events that the matching user plans to attend.

As further shown in FIG. 5, process 500 may include generating, by applying a machine learning model to the set of responses, at least one suggested cluster for a breakout subset of the set of users (block 540). For example, the conferencing system 301 (e.g., using processor 420 and/or memory 430) may generate, by applying a machine learning model to the set of responses, at least one suggested cluster for a breakout subset of the set of users, as described above in connection with FIG. 2C. As an example, the conferencing system 301 may provide the set of responses, associated with the set of users, as input to the machine learning model and may receive an indication of the at least one suggested cluster as output from the machine learning model.

As further shown in FIG. 5, process 500 may include determining, based on the at least one suggested cluster, at least one possible location (block 550). For example, the conferencing system 301 (e.g., using processor 420 and/or memory 430) may determine, based on the at least one suggested cluster, at least one possible location, as described above in connection with reference number 250 of FIG. 2D.

As an example, the conferencing system 301 may determine the at least one possible location based on a size of the at least one suggested cluster.

As further shown in FIG. 5, process 500 may include outputting an indication of the at least one suggested cluster and the at least one possible location (block 560). For example, the conferencing system 301 (e.g., using processor 420, memory 430, and/or output component 450) may output an indication of the at least one suggested cluster and the at least one possible location, as described above in connection with reference number 255 of FIG. 2D. As an example, an organizer device may output the indication in a web browser executed by the organizer device or as a push notification, among other examples. In some implementations, the conferencing system 301 may transmit the indication to an email address (e.g., included in an email message) and/or a phone number (e.g., included in a text message).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and/or FIGS. 2A-2D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating dynamic questions and clusters for events, the system comprising:
one or more memories; and
one or more processors, communicatively coupled to the one or more memories, configured to:
generate, by applying a first machine learning model to a dataset associated with a past bundle of events, a set of questions;

output the set of questions for a set of users registering for a current bundle of events;
receive a set of responses, corresponding to the set of questions, associated with the set of users;
identify, for a first user in the set of users, a subset of matching users in the set of users, based on the set of responses;
output an indication of the subset of matching users;
generate, by applying a second machine learning model to the set of responses, at least one suggested cluster for a breakout subset of the set of users;
determine, based on a location of a device associated with a second user in the set of users, attendance of the second user at a particular event in the current bundle of events; and
output, based on the attendance of the second user at the particular event, an indication of the at least one suggested cluster.

2. The system of claim 1, wherein the one or more processors, to receive the set of responses, are configured to:
receive the set of responses, from one or more devices associated with the set of users, during a registration procedure associated with the current bundle of events.

3. The system of claim 1, wherein the one or more processors are configured to:
receive, from a device associated with an organizer of the current bundle of events, a confirmation of the at least one suggested cluster; and
transmit, to one or more devices associated with the breakout subset, an indication of the at least one suggested cluster.

4. The system of claim 1, wherein the one or more processors are configured to:
receive, from one or more devices associated with the set of users, feedback associated with a first event in the current bundle of events,
wherein the at least one suggested cluster is further based on applying the second machine learning model to the feedback.

5. The system of claim 4, wherein the one or more processors are configured to:
identify, for a user in the set of users other than the first user, a second event in the current bundle of events, based on the feedback; and
output an indication of the second event.

6. The system of claim 1, wherein the one or more processors are configured to:
identify a change in registration associated with an event in the current bundle of events; and
output at least one possible location based on the change in registration.

7. The system of claim 1, wherein the one or more processors, to determine the attendance of the second user at the particular event, are configured to:
determine that the device associated with the second user was within a particular distance of a location associated with the particular event,
wherein the particular distance satisfies an attendance threshold.

8. A method of generating dynamic questions and clusters for events, comprising:
receiving a set of responses, corresponding to a set of questions, associated with a set of users;
identifying, for a first user in the set of users, a subset of matching users in the set of users, based on the set of responses;
outputting an indication of the subset of matching users;

generating, by applying a machine learning model to the set of responses, at least one suggested cluster for a breakout subset of the set of users;

determining, based on the at least one suggested cluster, at least one possible location;

determining, based on a location of a device associated with a second user in the set of users, attendance of the second user at a particular event in a current bundle of events; and outputting, based on the attendance of the second user at the particular event, an indication of the at least one suggested cluster and the at least one possible location.

9. The method of claim 8, further comprising:

determining that a device, associated with the first user, was within a particular distance of the device associated with the second user for an amount of time that satisfies a networking threshold, wherein the particular distance satisfies a closeness threshold; and updating the subset of matching users based on the amount of time.

10. The method of claim 8, wherein determining the attendance of the second user at the particular event comprises:

determining that the device associated with the second user was within a particular distance of a location associated with the particular event, wherein the particular distance satisfies an attendance threshold.

11. The method of claim 8, further comprising:

outputting an invitation to a chat room associated with the at least one suggested cluster.

12. The method of claim 8, further comprising:

receiving feedback associated with an event in a current bundle of events, wherein the at least one suggested cluster is further determined based on the feedback.

13. The method of claim 8, further comprising:

determining at least one possible host based on the at least one suggested cluster; and outputting an indication of the at least one possible host.

14. A non-transitory computer-readable medium storing a set of instructions for responding to questions and clusters for events, the set of instructions comprising:

one or more instructions that, when executed by one or more processors of a device, cause the device to:

transmit at least one response corresponding to at least one question;

receive an indication of at least one user, suggested for networking, based on the at least one response;

receive an invitation to a chat room associated with a cluster of users based on the at least one response;

transmit an indication of a location associated with the device, wherein the location associated with the device is associated with a first event in a bundle of events;

receive, in response to transmitting the indication of the location associated with the device, a request for feedback associated with the first event;

transmit, in response to the request for feedback, feedback associated with the first event, and receive an indication of a second event, in the bundle of events, based on the feedback and the at least one user suggested for networking.

15. The non-transitory computer-readable medium of claim 14, wherein the one or more instructions, when executed by the one or more processors, cause the device to:

receive an indication of at least one additional user, suggested for networking, based on the location associated with the device, wherein the location is associated with the at least one user.

16. The non-transitory computer-readable medium of claim 14, wherein the one or more instructions, when executed by the one or more processors, cause the device to:

transmit an indication to skip a third event, in the bundle of events, based on the feedback.

17. The non-transitory computer-readable medium of claim 14, wherein the one or more instructions, when executed by the one or more processors, cause the device to:

transmit a registration request for the bundle of events; and receive a prompt with the at least one question, wherein the at least one response is transmitted in response to the prompt.

18. The non-transitory computer-readable medium of claim 14, wherein the one or more instructions, when executed by the one or more processors, cause the device to:

transmit a confirmation associated with the second event; and receive an indication of a location for the second event in response to the confirmation.

19. The non-transitory computer-readable medium of claim 14, wherein the one or more instructions, when executed by the one or more processors, cause the device to:

receive an indication of a breakout group for the cluster of users.

20. The non-transitory computer-readable medium of claim 19, wherein the one or more instructions, when executed by the one or more processors, cause the device to:

transmit a confirmation associated with the breakout group; and receive an indication of a location for the breakout group in response to the confirmation.

\*  \*  \*  \*  \*